(12) United States Patent
Schmiedle et al.

(10) Patent No.: US 8,286,768 B2
(45) Date of Patent: Oct. 16, 2012

(54) INSULATING PROFILE FOR A CONDUCTOR LINE

(75) Inventors: Andreas Schmiedle, Lörrach (DE); Jörg Mutz, Eschbach (DE)

(73) Assignee: Conductix-Wampfler AG, Weil Am Rhein (DE)

( * ) Notice: Subject to any disclaimer, the term of this patent is extended or adjusted under 35 U.S.C. 154(b) by 167 days.

(21) Appl. No.: 12/664,087

(22) PCT Filed: Jun. 10, 2008

(86) PCT No.: PCT/EP2008/057219
§ 371 (c)(1),
(2), (4) Date: Dec. 11, 2009

(87) PCT Pub. No.: WO2008/152032
PCT Pub. Date: Dec. 18, 2008

(65) Prior Publication Data
US 2010/0181098 A1    Jul. 22, 2010

(30) Foreign Application Priority Data
Jun. 11, 2007   (DE) .......................... 10 2007 026 906

(51) Int. Cl.
*B60M 1/34* (2006.01)
*H02G 5/04* (2006.01)

(52) U.S. Cl. ........................................ 191/32; 174/68.2

(58) Field of Classification Search ................ 191/22 C, 191/22 R, 23 R, 29 R, 30, 31, 32, 33 R; 174/68.2, 174/72 B, 71 B, 73.1, 70 B, 99 B, 129 B, 174/133 B, 149 B
See application file for complete search history.

(56) References Cited

U.S. PATENT DOCUMENTS

| | | | |
|---|---|---|---|
| 2,534,804 | A | 12/1950 | Tiscione |
| 2,619,553 | A | 11/1952 | Kroeckel |
| 3,181,102 | A | 4/1965 | Fehr, Jr. |

(Continued)

FOREIGN PATENT DOCUMENTS

DE   2311614   9/1973
(Continued)

OTHER PUBLICATIONS

International Search Report mailed Oct. 6, 2008 for PCT/EP2008/057219 filed Jun. 10, 2008.

(Continued)

*Primary Examiner* — S. Joseph Morano
*Assistant Examiner* — Zachary Kuhfuss
(74) *Attorney, Agent, or Firm* — Martin Fleit; Paul D. Bianco; Fleit Gibbons Gutman Bongini & Bianco PL

(57) ABSTRACT

The invention relates to an insulating profile for a conductor line having at least one chamber extending in the longitudinal direction of the profile, said chamber being open in cross section to one side, thus defining an open front side of the insulating profile, and being suitable for mounting a busbar, the opening of the open chamber on the front side of the insulating profile expanding in a lateral direction such that the surface of the front side of the insulating profile is slanted toward the center of the nearest open chamber. The conductor line can be a multi-pole conductor line, the insulating profile comprising a regular arrangement of a group of a plurality of chambers extending in the longitudinal direction of the profile and being open to one side and each being suitable for mounting a busbar.

20 Claims, 6 Drawing Sheets

U.S. PATENT DOCUMENTS

| | | | |
|---|---|---|---|
| 3,345,471 A | 10/1967 | Kilburg | |
| 3,506,099 A | 4/1970 | Howell, Jr. | |
| 3,601,748 A | 8/1971 | Hart | |
| 3,771,103 A | 11/1973 | Attema | |
| 3,900,240 A | 8/1975 | Bertrams et al. | |
| 3,909,810 A | 9/1975 | Naden et al. | |
| 4,022,967 A | 5/1977 | Bulanchuk | |
| 4,105,099 A | 8/1978 | Bertrams et al. | |
| 4,109,768 A | 8/1978 | Fromme et al. | |
| 4,135,774 A * | 1/1979 | Senior et al. | 439/10 |
| 4,279,456 A | 7/1981 | Zucchini | |
| 4,335,807 A * | 6/1982 | Jones et al. | 191/32 |
| 4,343,384 A * | 8/1982 | Mutter | 191/22 R |
| 4,494,808 A | 1/1985 | Widell et al. | |
| 4,812,134 A | 3/1989 | Miller et al. | |
| 4,859,193 A | 8/1989 | Pfannkuche et al. | |
| 4,897,048 A | 1/1990 | Liebon et al. | |
| 4,919,625 A | 4/1990 | Coutre | |
| 5,012,746 A | 5/1991 | Bormann et al. | |
| 5,090,645 A * | 2/1992 | Zuercher | 248/68.1 |
| 5,261,840 A | 11/1993 | Benz | |
| 6,039,584 A | 3/2000 | Ross | |
| 6,241,064 B1 | 6/2001 | Hierzer | |
| 2010/0252297 A1 | 10/2010 | Schmiedle | |

FOREIGN PATENT DOCUMENTS

| | | |
|---|---|---|
| DE | 2311614 A1 | 9/1973 |
| DE | 2358895 A1 | 6/1974 |
| DE | 2717134 C2 | 11/1978 |
| DE | 2717134 C2 | 10/1981 |
| DE | 33 11 362 C1 | 7/1984 |
| DE | 3311362 C1 | 7/1984 |
| DE | 3440776 A1 | 5/1986 |
| DE | 29501448.2 U1 | 5/1995 |
| DE | 29501448.2 U1 | 6/1995 |
| DE | 196 47 336 A1 | 5/1998 |
| DE | 19647336 A1 | 5/1998 |
| DE | 19701987 C1 | 5/1998 |
| DE | 19755513 A1 | 6/1999 |
| DE | 199 17 309 A1 | 12/1999 |
| DE | 19917309 A1 | 12/1999 |
| DE | 19912574 A1 | 11/2000 |
| DE | 201 05 232 U1 | 8/2001 |
| DE | 20105232 U1 | 8/2001 |
| DE | 10159401 A1 | 6/2003 |
| DE | 102 57 646 A1 | 6/2004 |
| DE | 10257646 A1 | 6/2004 |
| DE | 103 59 541 A1 | 7/2005 |
| DE | 10359541 A1 | 7/2005 |
| EP | 0524084 A1 | 1/1993 |
| EP | 0666621 A2 | 8/1995 |
| EP | 0871263 A2 | 10/1998 |
| EP | 1750342 A1 | 2/2007 |
| FR | 2679385 A1 | 1/1993 |
| GB | 2137150 | 10/1984 |
| GB | 2137439 A | 10/1984 |
| NL | 1019697 A1 | 3/2002 |
| WO | 01/91250 A1 | 11/2001 |
| WO | 0191250 A1 | 11/2001 |
| WO | 03/049238 | 6/2003 |
| WO | 2007/017133 | 2/2007 |
| WO | 2008/152032 | 12/2008 |
| WO | 2008/152033 | 12/2008 |

OTHER PUBLICATIONS

International Search Report published Dec. 18, 2008 for PCT/EP2008/057219.
Written Opinion published Dec. 11, 2009 for PCT/EP08/57219.
International Preliminary Report on Patentability published Dec. 11, 2009 for PCT/EP08/57219.
International Preliminary Report on Patentability published Dec. 11, 2009 for PCT/EP08/57221.
Written Opinion published Dec. 11, 2009 for PCT/EP08/57221.
International Search Report mailed Jun. 10, 2008 for PCT/EP2008/057221.
Montagevorschrift, Wampfler Solutions for a moving world, Kompakt-Schleifleitung Programm 831, p. 1-9, www.wampler.com, printed Jan. 21, 2004.
International preliminary report on patentability published Jan. 12, 2010 for PCT/EP08/057219 filed Jun. 10, 2008.
Written Opinion published Jan. 11, 2010 for PCT/EP08/057219 filed Jun. 10, 2008.

* cited by examiner

INSULATING PROFILE FOR A CONDUCTOR LINE

BACKGROUND OF THE INVENTION

The invention relates to an insulating profile for a conductor line according to the preamble of claim 1. Such insulating profiles are known, for example, from DE 103 59 541 A1 and from DE 199 17 309 A1. Here, it involves a one-piece extruded plastic profile in which the busbars of a multi-pole conductor line are arranged insulated from each other. The profile is made from a plurality of chambers of which one group is open toward the front side of the profile. In the chambers of this group, the busbars are arranged and accessible from the open front side for the current collector of a vehicle traveling along the conductor line. Two other groups of chambers that are closed in cross section form the rear base of the profile and the insulation between the busbars, respectively.

Conductor lines of this type generally have a total length that makes it necessary to arrange several insulating profiles one after the other at end faces. Here, a mechanically stable connection between the individual insulating profiles of a conductor line must be created, wherein suitable connection elements are used. For engaging such connection elements, a corresponding shaping of the end regions of the insulating profiles is necessary that cannot be performed in the scope of the extrusion, but instead requires later processing, which increases the production expense.

In addition, there is the problem that, at the connection points between the individual insulating profiles of a multi-pole conductor line, the insulating effect is broken. There, the lengths of the air gaps and creep paths between the individual busbars, i.e., the shortest paths between the surfaces of two adjacent busbars through free space or along the surface of the insulating profile, which are specified by the cross-sectional shape along an insulating profile, no longer intersect. Instead, at such a connection point, if additional measures are not taken, the length of the air gap is given by the direct distance of two adjacent busbars and the length of the creep path is given by the shortest path between two adjacent busbars on the end face of the insulating profile. These lengths effective at a connection point are generally significantly shorter than the corresponding lengths along the insulating profile.

The lengths of the air gaps and creep paths are subject to appropriate safety regulations that must be observed under the aspect of product liability, and, indeed, along an entire conductor line, i.e., also at said connection points. This is naturally more difficult to achieve if the total dimensions of a conductor line are to be more compact. One possibility for extending the air gaps and creep paths at the connection points between the individual insulating profiles to safety-regulation values consists in the joining of additional insulating elements in this region in the course of the assembly of the individual insulating profiles. For this purpose, the end regions of the insulating profiles must be prepared for holding said insulating elements, wherein additional expense is incurred in the production of the insulating profiles. This applies especially when later processing of the insulating profiles must be performed on the end faces.

On the front or engagement side of an insulating profile, existing systems create the necessary creep paths through individual webs that project forward and that look similar to horns in cross section. These projecting webs can be easily produced through extrusion because they can be reached from all sides and, therefore, can be easily formed to size during the cooling. In addition, this allows a transverse web lying behind and connecting two such adjacent webs to still be reachable during the cooling, at least on one side for the surrounding medium. They even improve the ability to achieve dimensional stability for such a transverse web, in that a tensile force that prevents contraction can be applied to the transverse web via the projecting webs.

In one section of the conductor line in which current collectors are to be inserted from the outside into the insulating profile, i.e., in the region of a so-called tangential entrance, the webs projecting forward are disruptive because, in practice, in the case of an often unavoidable lateral positional deviation, a current collector can remain hanging on such a projecting web and can even end up on a transverse web connecting two such adjacent webs instead of in a chamber with a busbar. To avoid this result, the cross section of the insulating profile must be designed with a funnel shape in such a region, to always deflect a laterally incorrectly positioned current collector into the closest chamber with a busbar. For this purpose, an additional component must be applied to the front side of the insulating profile between every two chambers, with this component fulfilling the following requirements:

Filling out the cross section from the existing horn shape into a roof-like shape Rigid connection of the part to be applied to the insulating profile even under temperature fluctuations and deformations No formation of significant gaps between the applied part and the insulating profile No disconnection of insulating components and no shortening of creep paths No collision with current collectors Continuous transition in the longitudinal direction of the profile from the region of the funnel into the region without this function Typically, due to the first requirement and the last two requirements, a hollow profile is not used, but instead, a solid component that is beveled accordingly on its longitudinal ends. This component is then usually bonded because plastic screws or rivets are rarely installed in installation spaces of the type present here and metal screws form short cuts for the creep path, and there would be potential risk in the case of contact with the busbars due to incorrect assembly. Because bonded joints are sensitive, these are usually made at the factory. This produces a high expense in terms of design, information, and logistics because the positions required along a conductor line with the possibility of tangential entrance must be determined in advance, the required lengths in between must be determined, and the material must be allotted accordingly. In addition, it must be avoided that current feed-in devices, expansion connectors, or the like are to be inserted at these positions because these parts usually cannot be provided with a tangential funnel function at all or only at high expense.

SUMMARY OF THE INVENTION

In view of these conditions, one problem of the invention is to create an insulating profile for a conductor line, with this profile guaranteeing an especially reliable operation of the conductor line and simplifying economical production.

This problem is solved according to the invention by an insulating profile with the features of claim 1. Advantageous constructions of the invention are specified in the subordinate claims.

According to the invention, the opening of an open chamber suitable for holding a busbar expands at the front side of an insulating profile in the lateral direction such that the surface of the front side of the insulating profile is inclined at each point toward the center of the closest open chamber. This has the effect of deflecting the current collector for the insertion into the insulating profile in the case of a slight lateral incorrect positioning at each point in the correct direction, i.e., toward the busbar to be contacted. Such a deflection is of interest, especially for the so-called tangential entrance, when the vehicle to be powered is driving around a curve and must change the conductor line in use. Then, the current collectors must first contact the new conductor line to be used and, for this purpose, must lower tangentially into the open chambers with the busbars. Because the path of motion of a vehicle and, thus, also that of its current collectors is unavoidably loaded with certain tolerances, in the case of tangential entrance, a certain lateral incorrect positioning of the current collectors relative to the conductor line must always be taken into account. This problem is made significantly more difficult due to the inclined shape of the surface of the front side of the insulating profile that causes an automatic position correction of the current collectors during the insertion into the insulating profile.

According to the invention, the insulating profile constructed as a single component provides the function of a tangential funnel along its entire length, wherein the region with a funnel-shaped cross section is an integral component of the insulating profile, so that neither an assembly of additional parts nor a consideration of the tangential entrance positions is necessary during the planning of the system. Instead, the conductor line can be used for tangential entrance along the entire distance. The invention can be applied equally for insulating profiles for one-pole or multi-pole conductor lines.

The stated inclined shaping of the wall sections of the insulating profile located between the openings of the open chambers also allows it to generate openings that could be used for a positive-fit connection of two insulating profiles close to each end face of the profile in these wall sections efficiently through a single cut in the transverse direction of the insulating profile. Here, the extent of the openings in the longitudinal direction of the profile can be specified by the cutting width and the extent in the transverse direction by the cutting depth.

In the case of an insulating profile for a multi-pole conductor line that has a regular arrangement of several chambers extending in the longitudinal direction of the profile, it is useful that the chambers of a closed group of chambers extend from the rear wall of the insulating profile formed by wall sections of several closed chambers lying one next to the other in the direction of the open front side of the profile defined by a group of chambers open toward one side via the provided position of the front surfaces of the busbars into the open chambers, and that at least one closed chamber of this group is arranged between two adjacent open chambers. In this way, namely between the regions of two adjacent open chambers in which busbars are located in the completed state of the conductor line, sufficiently long air gaps and creep paths can be guaranteed at connection points between insulating profiles connecting to each other at end faces, with these air gaps and creep paths fulfilling the appropriate safety regulations, without processing of the insulating profiles from the end faces being necessary. Instead, the end faces can simply remain planar.

Under the viewpoint of mechanical stability of the insulating profile, it is advantageous to divide the space specified by the cross-sectional contours of the insulating profile into smaller units through the formation of additional groups of closed chambers because the additional chamber-separating walls impart higher stability to the profile. Another useful measure in the shaping of the insulating profile is the one-piece formation of attachment elements for attachment to a carrier profile on its rear wall.

BRIEF DESCRIPTION OF THE DRAWINGS

Additional details and advantages of the invention emerge from the subordinate claims and from the following description of an embodiment with reference to the drawings. Shown in the drawings are:

DETAILED DESCRIPTION OF THE INVENTION

Figure 1:
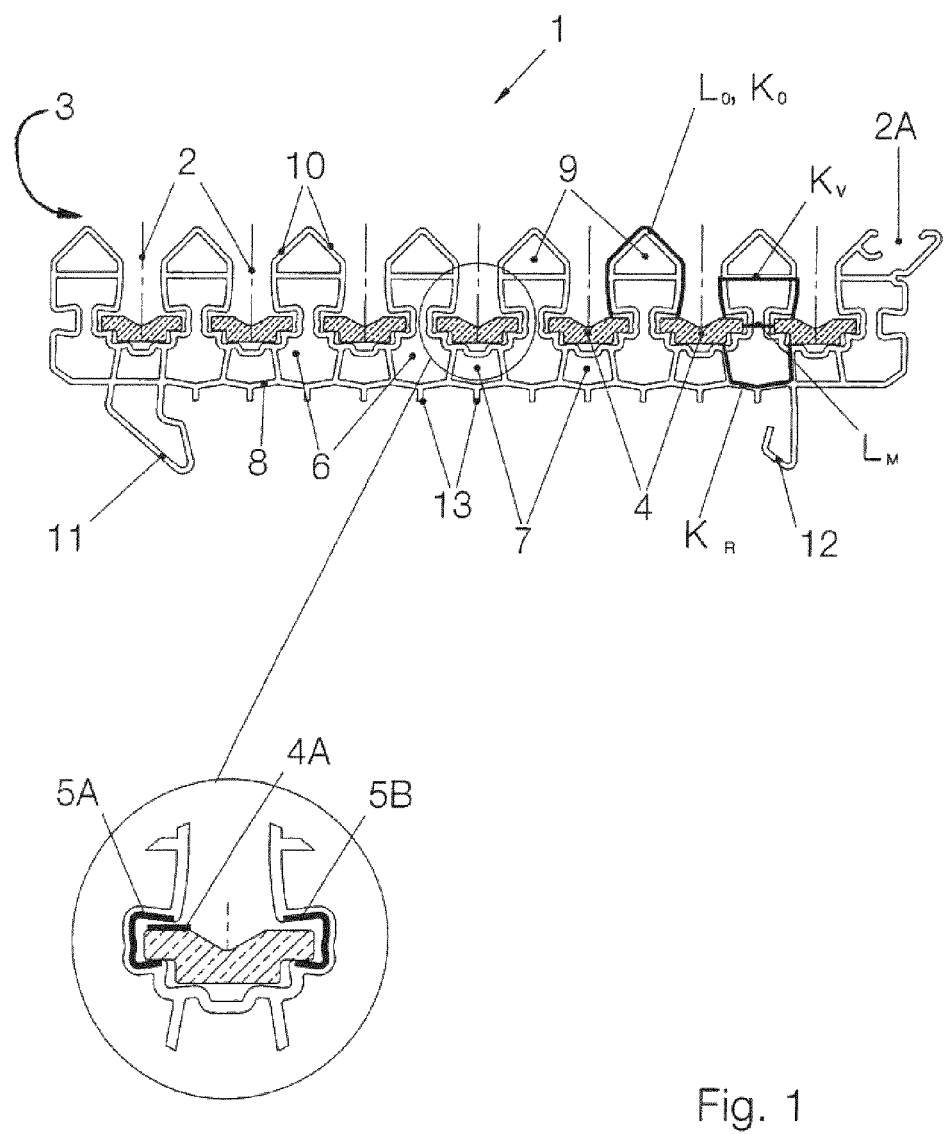
FIG. 1, a cross-sectional view of an insulating profile according to the invention, FIG. 2, a cross-sectional view of the insulating profile from FIG. 1 in connection with a carrier profile, FIG. 3, a perspective view of the insulating profile from FIG. 1, FIG. 4, a perspective view of a cutout of the insulating profile from FIG. 1 with connection elements according to the invention in two different positions, and FIG. 5, a connection element according to the invention in four different views, FIG. 6, a cross-sectional view of an enlarged cutout of the insulating profile from FIG. 1 with a plug of a connection element located therein.

As FIG. 1 illustrates, an insulating profile 1 that is constructed according to the invention as a one-piece component and that is produced from plastic by means of extrusion has, in cross section, a regular arrangement of several chambers that extend, in the longitudinal direction of the profile, i.e., vertical to the plane of the drawing of FIG. 1. One group of chambers 2 is open toward one side in cross section and, therefore, defines an open front side 3 of the insulating profile 1 located at the top in FIG. 1. Each of the chambers 2 of this open group has two undercuts 5A and 5B suitable for the positive-fit holding of a busbar 4. Wall sections of several adjacent closed chambers 6 and 7 together form a rear wall 8 of the insulating profile 1 lying opposite the open front side 3 of the insulating profile and located at the bottom in FIG. 1.

The terms "open" and "closed" used here in connection with a group of chambers do not mean a property of the grouping, but instead a property of each of the individual chambers belonging to the group. The term "group" here shall express that all of the chambers belonging to a group have the same cross-sectional shape. The position of the insulating profile 1 shown in FIG. 1 is not necessary its installation position at a position of use because this is typically upright, that is, rotated by ±90° relative to the diagram of FIG. 1. However, it may also be rotated by 180°. In so far as terms such as "top" and "bottom" designating vertical arrangements are used here, these merely refer to the position of the insulating profile 1 in FIG. 1.

The chambers 6 of a first closed group extend from the rear wall 8 of the profile 1 in the direction of the open front side 3 of the profile 1 via the undercuts 5A, 5B of the chambers 2 of the open group and, thus, via the provided position of the front surfaces 4A of the busbars 4. Each chamber 6 of this first closed group is arranged between two adjacent chambers 2 of the open group. A narrowing of the widths in the middle region is produced for the chambers 6 of the first closed group by means of the undercuts 5A, 5B. Between two adjacent chambers 6 of the first closed group, there is a chamber 7 of another closed group underneath the chamber 2 of the open group lying in-between. On the open front side 3 of the insulating profile 1, there is a chamber 9 of another closed group between two adjacent chambers 2 of the open group, with this chamber bordering a chamber 6 of the first closed group, that is, on its top, i.e., front end. The outer wall 10 of a chamber 9 facing the front side 3 of the profile 1 has, in cross section, a projecting shape, in the example shown in FIG. 1, essentially that of a gabled roof.

This shape of the front outer wall 10 of the top closed chamber 9 has the advantage that, during movement into the open chamber 2 for forming a contact with a busbar 4, in the case of a slightly laterally incorrect positioning, a current collector is automatically deflected in the correct direction, i.e., toward the middle of the open chamber 2. It is understood that the roof shape of the outer wall 10 in the shown embodiment is only one of several possible constructions of the underlying principle. Here, all that matters is that, between the front-side openings of two adjacent open chambers 2, the outer wall 10 has a generally projecting shape inclined monotonically toward the middle of the closest open chamber 2.

The shape of the outer wall 10 can be round overall or planar in some sections, as is the case for the roof shape of the shown embodiment. All that is essential is that the outer wall 10 also has a profile increasing monotonically toward the front between the front-side openings of two adjacent open chambers 2 with increasing lateral distance from the middle of an open chamber 2, i.e., the distance of its surface from the provided position 4A of the busbar 4 increases monotonically toward the front. It does not matter whether this is realized in the form of a round profile or a profile that is planar in some sections and whether the gradient of the surface decreases or increases with increasing distance from the provided position 4A of the busbar 4, that is, has a convex or concave basic shape of the funnel opening of the open chamber 2. Logically, the surface of the outer wall 10 has its most forward position exactly in the middle between two open chambers 2, where there is a singularity in the form of a position of equal distance from two adjacent open chambers 2.

The funnel-shaped expansion of the openings of the open chambers 2 caused by the shaping of the outer wall 10 on the front side of the insulating profile 1 could also be applied fundamentally to an insulating profile for a one-pole conductor line. In this special case, the insulating profile would already end in the lateral direction at the point at which lies, in the embodiment shown here, the middle between two adjacent open chambers 2 and would be closed by a vertical side wall. The effect of the automatic deflection of a slightly incorrectly positioned current collector in the open chamber 2 with the busbar 4 would also be given in this special case of a one-pole conductor line.

As is directly visible from the cross-sectional view of FIG. 1, the shortest connection between two adjacent busbars 4 runs along an insulating profile 1 both in free space and also on the surface of an insulator each on the front-side surface of the insulating profile 1, i.e., the lengths $L_0$ and $K_0$ of the so-called air gaps and creep paths are equally long and specified by the cross-sectional shape of the wall sections of the closed chambers 6 facing the open chambers 2 and also the outer walls 10 of the closed chambers 9. In FIG. 1, the coinciding air gaps and creep paths $L_0$ and $K_0$ in this case are designated on a chamber 6 and the associated chamber 9 by a thick line along said wall sections and outer walls, respectively.

On one end face of an insulating profile 1, however, its insulation effect is broken, so that if additional measures were not taken, the air gaps $L_M$ would be given by simply the shortest distance between two adjacent busbars 4. This air gap $L_M$ that is significantly shorter than the air gap $L_0$ active along the profile 1 is designated by a short thick line in FIG. 1 at one position.

For the creep path, here the cross-sectional shape of the chambers 6 lying between the busbars 4 is decisive because, now, a creep current can flow on the end face of the profile 1 along the end faces of the walls of the chambers 6. For such a creep current, the walls of the chambers 6 provide two paths, namely one via the front side 3 of the profile 1 and one via the rear side of the profile 1. Each of the creep paths $K_V$ and $K_R$ are similarly recorded in FIG. 1 as thick lines. While the creep path $K_R$ runs via the rear wall 8 of the profile 1, for the creep path $K_V$, the separating wall between each chamber 6 and adjacent chamber 9 is decisive. This separating wall contributes to the mechanical stability and does not harm the length of the effective creep path because the lengths of the two creep paths $K_V$ and $K_R$ are approximately equal in the embodiment shown in FIG. 1. Leaving out said separating wall would indeed lengthen the creep path $K_V$, but not the overall effective creep path because the latter is determined by the shorter of the two creep paths $K_V$ and $K_R$.

As can be seen from FIG. 1, the extent of the chambers 6 provides, over a large portion of the height of the profile 1, i.e., from the rear wall 8 up to significantly past the undercuts 5A, 5B towards the front, for a relatively large value of the lengths of the creep paths $K_V$ and $K_R$. To achieve the same creep-path length for a smaller extent of the chambers 6 in height, the lateral extent of the chambers 6 would have to be larger, which would lead overall to a widening of the profile 1. This would run counter to the goal of the most compact construction possible, as pursued in modern conductor lines. The shape of the chambers 6 according to the invention allows a compact construction of a conductor line to be accommodated with the observance of the regulated minimum lengths of the creep paths at the end-face connection points of the individual insulating profiles 1 that belong unavoidably to the construction of a conductor line of typical length.

The rear-side creep path $K_R$ could be lengthened indeed through the elimination of the construction of the chambers 7 lying behind the busbars 4, i.e., through a direct bordering of adjacent chambers 6 behind a busbar, but this would negatively affect the stability of the profile 1 because each busbar 4 would be supported in this case by only a single chamber separating wall. In addition, the overall effective creep-path length would not be lengthened because this would then be determined by the front-side creep path $K_V$.

Figure 2:
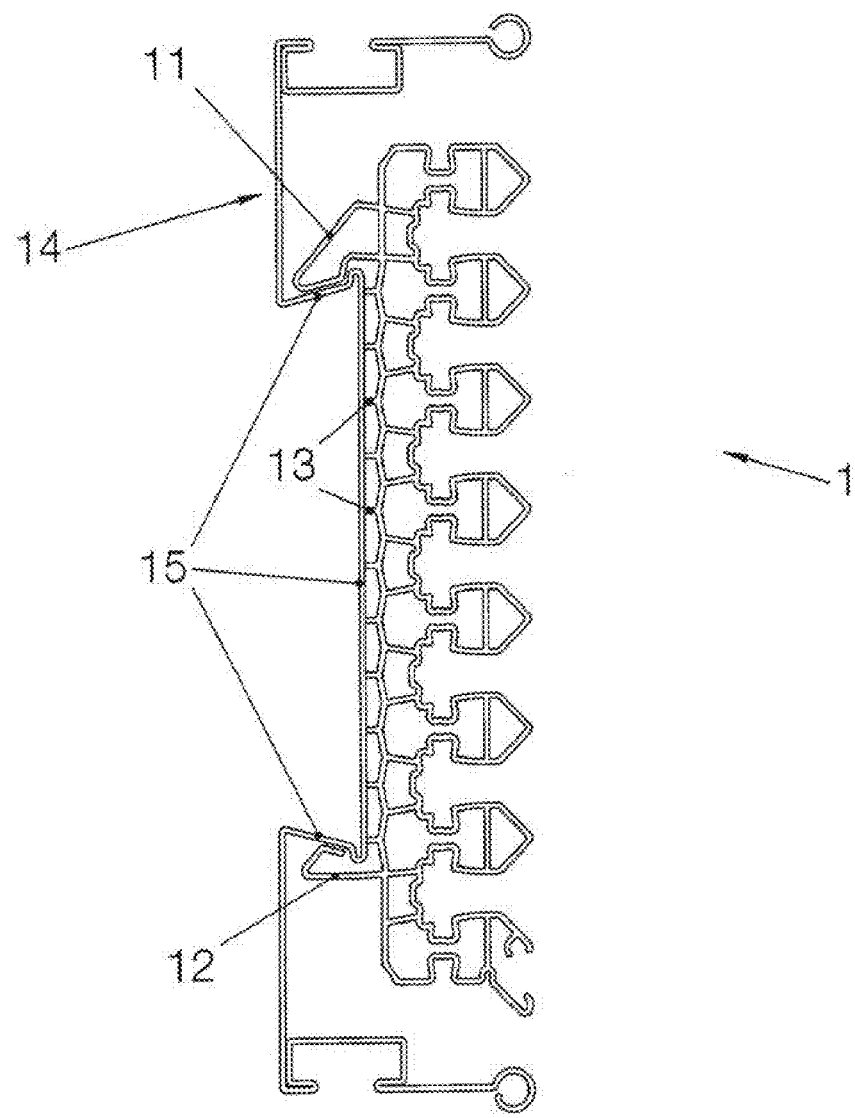

In FIG. 1, two essentially hook-shaped attachment elements 11 and 12 formed in one piece on the rear wall 8 and also ribs 13 projecting perpendicularly from the rear wall 8 can be seen. These elements are used for attaching the insulating profile 1 on a carrier profile 14 shown in FIG. 2. As FIG. 2 shows, the carrier profile 14 has, in its middle section 15, a shape complementary to the rear side of the insulating profile 1, so that the insulating profile 1 can be snapped with the help of the attachment elements 11 and 12 onto the middle section 15 of the carrier profile 14 and is then connected to this with a positive fit. Here, the ribs 13 support the rear wall 8 of the insulating profile 1 on the carrier profile 14.

Furthermore, in FIG. 1 at the right edge of the insulating profile 1, a chamber 2A is to be seen that is open toward the front side and whose shape deviates significantly from that of the open chambers 2 provided for holding the busbars 4. This chamber 2A is provided to hold a data line that runs along the conductor line and enables communications, especially through non-contact, inductive data transmission, from a vehicle powered with electrical energy through the conductor line to a central control device and/or to other vehicles moving along the same conductor line. Therefore, the requirement for a separate mount for holding such a data line is eliminated.

As an alternative to or in addition to a data line, in the edge chamber 2A, a data carrier written with position information could also be arranged, wherein, with reference to this data carrier, a vehicle moving along the conductor line could determine its own position continuously or at least at specified locations by means of a corresponding reading device. This position information could then be used for controlling the movement of the vehicle.

Figure 3:
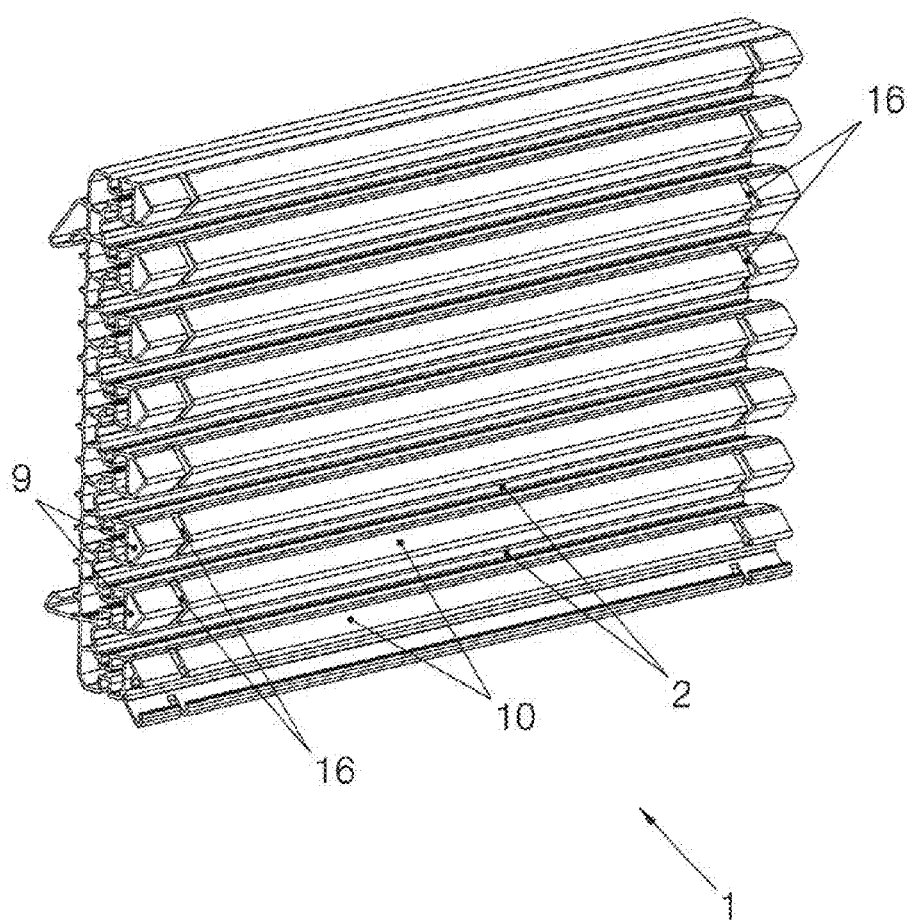

FIG. 3 shows a perspective view of an insulating profile 1 according to the invention. Here, the length is not drawn to scale in relation to the width, but instead is greatly shortened. Especially visible in the view of FIG. 3 are openings 16 in the convex outer walls 10 of the chambers 9 close to the two ends of the insulating profile 1, i.e., at a specified distance from its end faces. These openings 16 all have the same shape, i.e., an overall equal length in the longitudinal direction of the profile 1, as well as an overall equal width perpendicular to the length. In the shown embodiment in which each of the outer walls 10 has the shape, essentially, of a gabled roof, the width of an opening 16 extends across nearly the entire width of a chamber 9.

Figure 4:
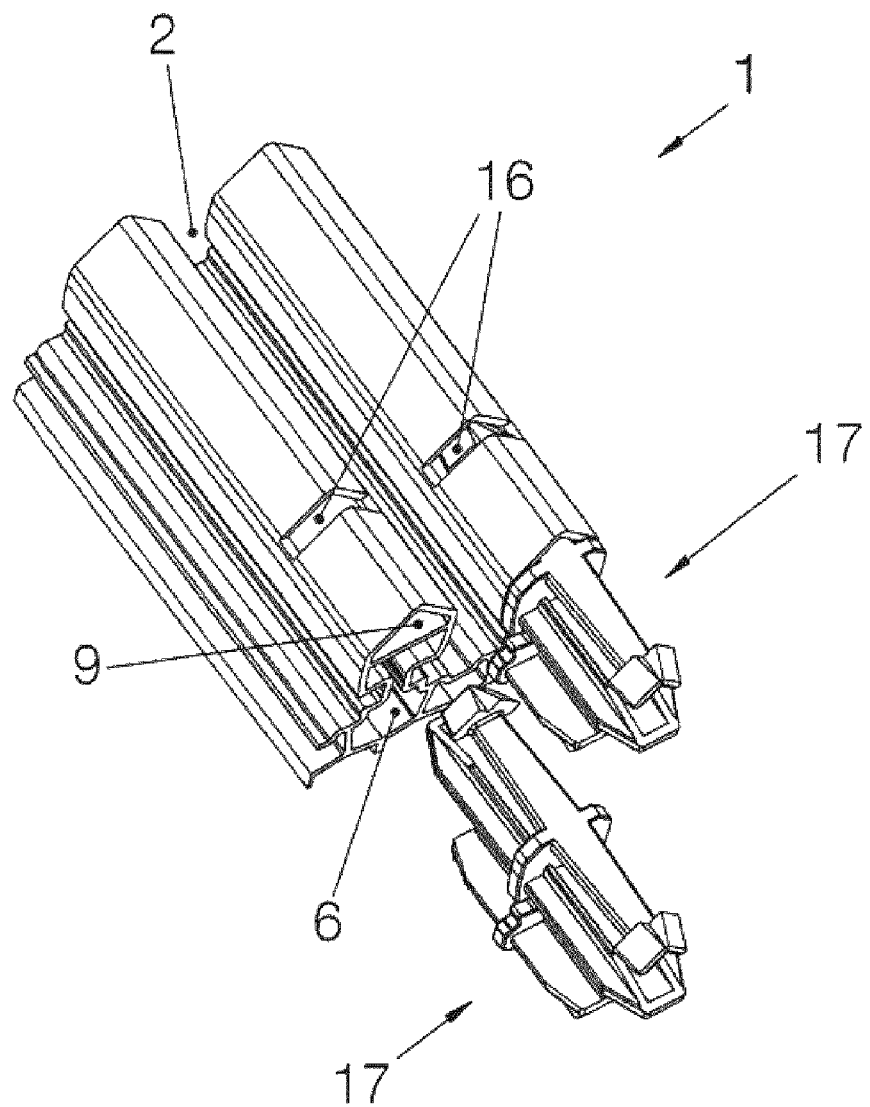

The openings 16 are used for the positive-fit, end-face connection of several insulating profiles 1 to each other using suitable connection elements, which will be further explained with reference to FIGS. 4 and 5. The advantage of this shape of openings 16 consists in that all of the openings 16 can be produced close to one of the two ends of the profile 1 in an extremely efficient way by means of a single cut in the transverse direction, wherein the length of the openings 16 in the longitudinal direction of the profile 1 results from the width of the cutting blade and the width in the transverse direction results for a given, projecting shape of the outer wall 10 of a chamber 9 from the depth of the cut. Serial processing for the production of each individual opening 16 is, thus, unnecessary. It is understood that a projecting shape of the front-side wall sections 10 of the profile 1 between the open chambers 2, with these sections being formed by the outer walls 10 of the chambers 9, represents the prerequisite for the ability to produce the openings 16 in such a way.

As previously explained, the shaping of the chambers 6 according to the invention already provides, by itself, for a sufficient creep-path length at a connection point of two insulating profiles 1. The creation of an air gap of regulated length still requires the insertion of an insulating element into the chambers 6 at the connection points to break the initially much too short air gap $L_M$, as is marked in FIG. 1. This measure is shown in FIG. 4 with reference to a cutout of the insulating profile 1 according to the invention. The cutout shows at the bottom left a connection element 17 made from an insulating material in front of a closed chamber 6 in an orientation in which it can be inserted through linear displacement into the chamber 6, wherein a part of the connection element 17 simultaneously also reaches into the chamber 9 lying above. At the bottom right, another identical connection element 17 is to be seen that is already inserted completely, i.e., as much as possible, into the chamber 6.

Figure 5:
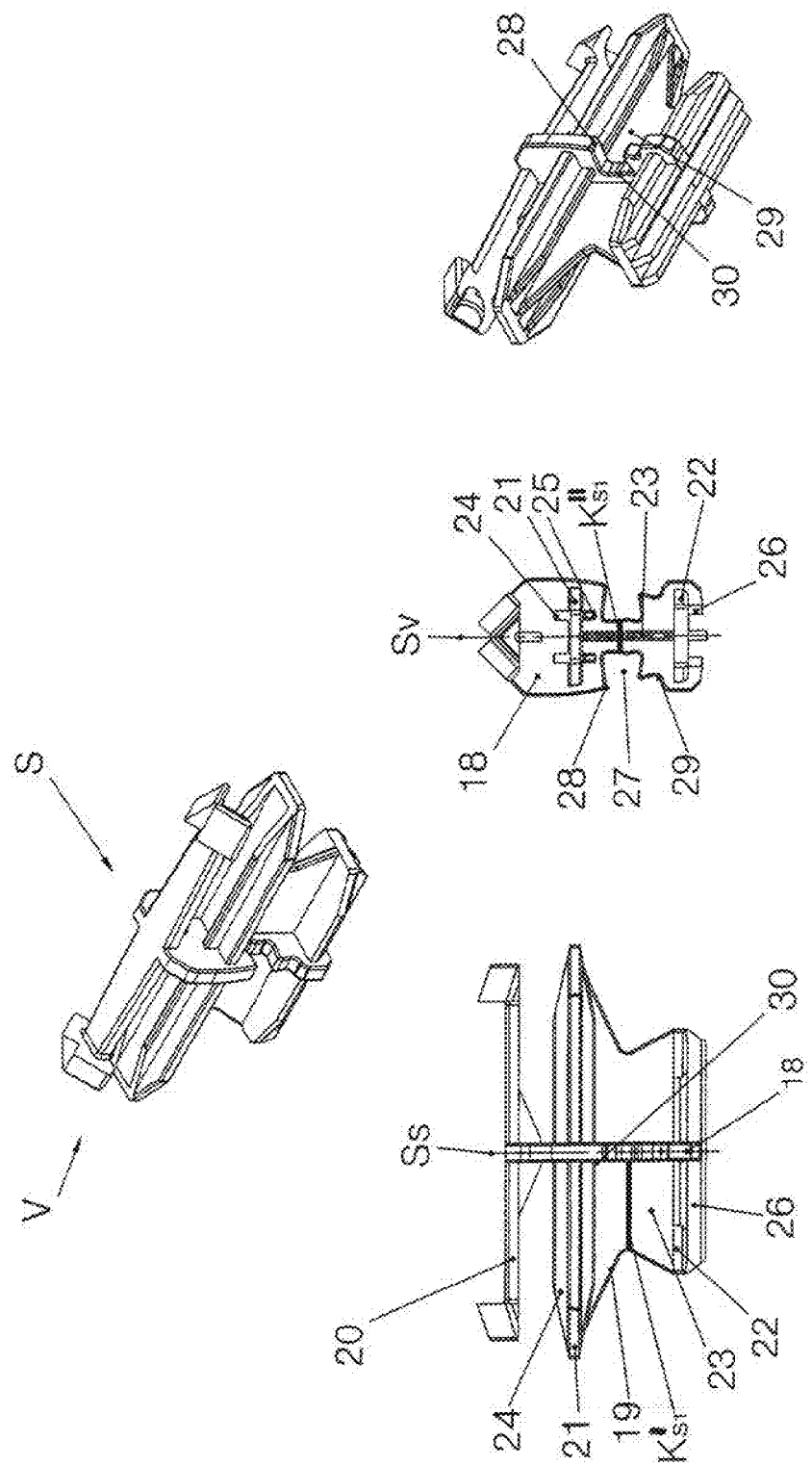

The connection element 17 is shown in FIG. 5 in four views, namely at the top left in a perspective view from above, in the middle left in a side view, in the middle right in a front view, and at the bottom right in a perspective view from below. In the perspective view at the top left, the directions of the side view and the front view are each indicated by arrows designated with S and V, respectively. In the side and front views, lines of symmetry $S_S$ and $S_V$, respectively, are drawn with dashed lines that mark a plane of symmetry running perpendicular to the plane of the drawing.

The connection element 17 is made from a base plate 18, two plugs 19 projecting perpendicularly from the base plate 18 symmetric to its center plane, as well as two snap hooks 20 projecting perpendicularly from the base plate also symmetric to its center plane. For the sake of clarity, in the side view, only one of the two symmetric halves is provided with reference numbers. The outer contours of the plug 19 are adapted to the inner contours of the chamber 6 so that the plug 19 can be inserted with little or no play into the chamber 6 at one end face of the insulating profile 1. As illustrated especially in the perspective diagrams and in the front view, the plug 19 has, seen from the front, an upper and a lower transverse web 21 and 22, respectively, and between these two a main web 23, so that it has, in the front view, approximately the basic shape of the capital letter I. This shape corresponds to the cross-sectional shape of the chamber 6, wherein the main web 23 is allocated to the central narrowing of the chamber 6 through the undercuts 5A, 5B of the adjacent open chambers 2, while the two transverse webs 21 and 22 are allocated to the two wider regions of the chamber 6 above or below said central narrowing.

The outer contours of the cross section of the plug 19 do not have to correspond exactly to the inner contours of a chamber 6, but instead, all that matters is that the plug 19 is positioned after insertion into a chamber 6 with sufficient accuracy in this chamber to achieve an insulating effect between two adjacent busbars 4, which is still to be explained below. In the shown embodiment, the width of the transverse webs 21 and 22 is dimensioned so that these contact laterally on the wall of the chamber 6 after the insertion of the plug 19 into a chamber 6 and, thus, provide for a fixing of the plug 19 in the lateral direction. This is clearly visible in FIG. 6 that shows a cross-sectional view of an enlarged cutout of the insulating profile of FIG. 1, namely a chamber 6 and a chamber 9 with a plug 19 of a connection element 17 located in the chamber 6. Between the plug 19 and the wall of the chamber 6, minimal play can still be present.

In addition, two top and bottom ribs 24 and 25, respectively, project perpendicularly from the top transverse web 21. These are dimensioned so that they contact the separating wall between the chamber 6 and the adjacent chamber 9 or the wall sections of the chamber 6 that form the top sides of the undercuts 5A, 5B. Here, they provide for fixing the plug 19 in the vertical direction, wherein minimal play can also still be present here. Three additional ribs 26 project downwards perpendicularly from the bottom transverse web 22. After the insertion of the plug 19 into a chamber 6, these do not contact its wall because this is no longer necessary for fixing the plug 19 and would result only in tensioning this part. The function of the ribs 26 will be explained later.

As is visible, in particular, from the two perspective diagrams in FIG. 5, the end regions of the plug 19 are beveled, that is, both on the transverse webs 21 and 22 and also on the ribs 24, 25, and 26. This measure is used for simplifying the insertion of the plug 19 into a chamber 6.

The outer contours of the base plate 18 in the front view V corresponds in part to the common outer contours of the cross section of the chambers 6 and 9 including the walls, that is, in the region of the open front side of the insulating profile 1 up to the undercuts 5A, 5B of the adjacent open chambers 2 to which corresponding cutouts 27 in the base plate 18 are allocated. Deviations consist in the front-side end region of the insulating profile 1, i.e., the projecting wall sections 10, as well as in the region of the chamber 6 facing the rear wall 8.

When a plug 19 is inserted into an insulating profile 1, the base plate 18 contacts the end faces of the walls of the chambers 6 and 9 and forms, in this way, a stop that limits the insertion depth. On the other hand, at no point does the base plate 18 project past the walls of the chambers 6 and 9, that is, not into the cross sections of the adjacent open chambers 2 above the busbars 4, so that these cross sections in which the current collectors move are not changed by the insertion of a connection element 17, and the movement of the current collectors is not disturbed.

When a plug 19 is inserted into a chamber 6 of an insulating profile 1, a snap hook 20 of the connection element 17 is simultaneously pushed into the adjacent chamber 9 of the insulating profile 1. The length of the snap hook 20 of a connection element 17 is dimensioned so that, after the complete insertion of a plug 19, i.e., when the base plate 18 contacts the end face of the profile 1, a snap hook 20 is led into positive-fit engagement with the opening 16 in the convex wall section 10 of the chamber 9, i.e., snaps into this opening 16. In this way, the connection element 17 is reliably fixed to the profile 1.

Through the insertion of a connection element 17 into all of the chambers 6 and 9 at the end face of a first insulating profile 1 and the subsequent placement of a second insulating profile 1 onto the connection element 17 inserted into the first insulating profile 1, the two insulating profiles 1 could be connected rigidly to each other, that is, so that they align with each other in the longitudinal direction to guarantee an unimpeded linear movement of current collectors into the open chambers 2 through the connection point. Through successive connection of several insulating profiles 1 each using a series of connection elements 17 and subsequent drawing of busbars into the open chambers 2, a compact, multi-pole conductor line of arbitrary length could be produced.

It is clear that the too short air gap $L_M$ (FIG. 1) at the connection point between two insulating profiles 1 is broken by the insertion of the connection elements 17. The length of the air gaps and creep paths at the connection point is now determined by the shape of the connection elements 17. Under the assumption that, in the least favorable case, a connection element 17 can contact, with the edges of the cutouts 27 of its base plate 18, two adjacent busbars, there are three possible creep paths between two adjacent busbars on the surface of a connection element 17.

A first creep path $K_{S1}$ runs directly at the height of the busbars 4, i.e., on the connection element 17 at the height of the cutouts 27 of its base plate 18 from the inner edge 30 of a cutout 27 on the base plate 18 to the plug 19, then in a straight line in the longitudinal direction of the plug 19 on its main web 23 up to its end, around this, on the other side of the main web 23 back up to the base plate 18, and finally, on this, up to the inner edge 30 of the opposite cutout 27. Parts of this creep path are drawn in FIG. 5 and here marked in the side view as $K_{S1}'$ and in the front view as $K_{S1}''$, wherein $K_{S1}''$ designates the entire length of the part visible in the front view. For the length of the creep path $K_{S1}$ the following is valid: $K_{S1}=2 \cdot K_{S1}'+K_{S1}''$.

Figure 6:
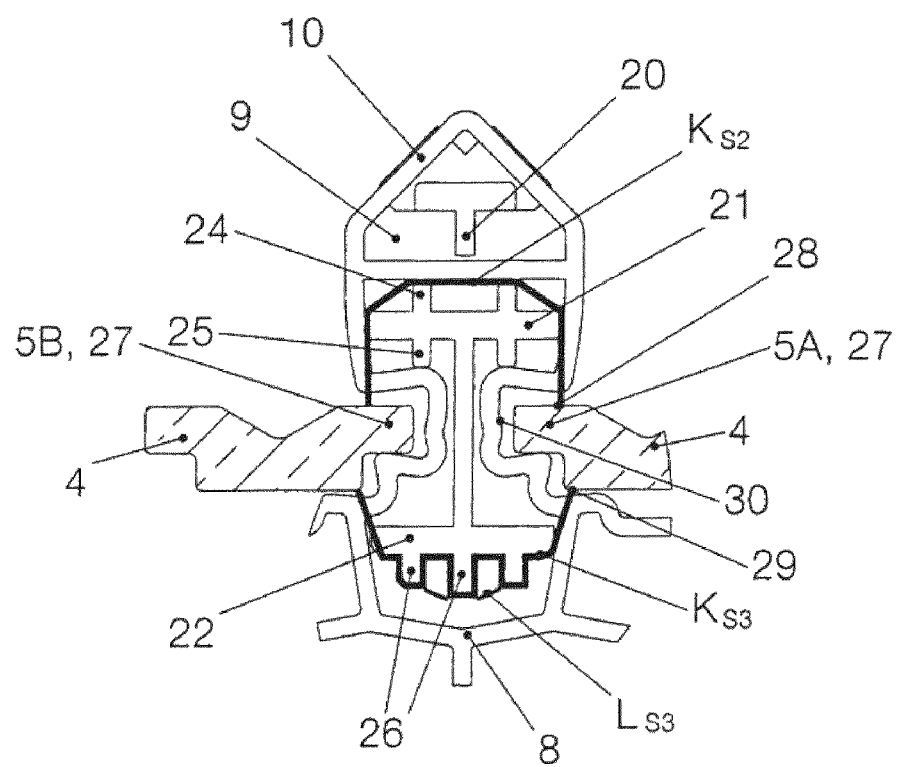

The profiles of the second and the third creep paths $K_{S2}$ and $K_{S3}$ are visible with reference to the cross-sectional view of FIG. 6 and marked there by thick lines. There exists a top creep path $K_{S2}$ that starts from the top side of a busbar 4 in the region 28 of an upper corner of the cutout 27 of the base plate 18. On this, it leads approximately vertically up to the end of the top transverse web 21, then, at an angle up to the end of the first top rib 24, then horizontally up to the end of the second top rib 24, again at an angle up to the opposite end of the top transverse web 21, and finally again approximately vertically up to the upper corner of the opposite cutout 27 and in this region, to the busbar 4 located there.

Furthermore, there is a bottom creep path $K_{S3}$ that starts from a lower corner 29 of the cutout 27 of the base plate 18. On this, it leads approximately vertically up to the end of the bottom transverse web 22, at an angle up to the end of the first bottom rib 26, then to the bottom side of the bottom transverse web 22, there around the middle bottom rib 26, again up to the lower end of the third lower rib 26, from there again at an angle on the base plate 18 up to the opposite end of the lower transverse web 22, and finally again approximately vertically up to a lower corner of the opposite cutout 27.

Because the base plate 18 does not extend downward past the bottom transverse web 22, but instead reaches only from the outside to the two outermost of the lower ribs 26, the bottom creep path $K_{S3}$ on the bottom side of the lower transverse web 22 between the two outermost of the lower ribs 26 exactly follows the cross section of the lower surface of the plug 19. This is not the case on the top side of the top transverse web 21 because here the base plate 18 reaches significantly past the upper transverse web 21 including the upper ribs 24. Therefore, the creep path $K_{S2}$ runs there between the ends of the two upper ribs 24 in a straight line, namely on the base plate 18.

The length of the creep path on the surface of the connection element 17 is the length of the shortest of the three paths $K_{S1}$, $K_{S2}$, and $K_{S3}$. This is then still to be compared with the lengths of the creep paths $K_V$ and $K_R$ (FIG. 1) on the end face of the insulating profile 1, wherein, in turn, the shortest of all of the paths is the final measure for the length of the overall effective creep path that must satisfy the appropriate safety regulations.

Each of the two creep paths $K_{S1}$ and $K_{S2}$ coincides with corresponding air gaps $L_{S1}$ and $L_{S2}$, respectively because they represent along each of their profiles also the shortest possible path in free space between two adjacent busbars 4 around the connection element 17. These two air gaps $L_{S1}=K_{S1}$ and $L_{S2}=K_{S2}$ are to be compared with a third air gap $L_{S3}$ that corresponds approximately to the creep path $K_{S3}$, but is somewhat shorter than this on the bottom side of the lower transverse bar 22 because it runs there directly between the lower ends of the three lower ribs 26 and contains no loops back to the bottom side of the lower transverse web 22. The smallest of the lengths of the three air gaps $L_{S1}$, $L_{S2}$, and $L_{S3}$ is the final measure for the length of the overall effective air gap that must fulfill the appropriate safety regulations. It can be seen directly that this air gap is significantly longer than the air gap $L_M$ recorded in FIG. 1 without the presence of the connection element 17.

From the preceding description of an embodiment, for those skilled in the art, a plurality of possible variations may be realized for the shape of the cross section of the insulating profile 1. For example, the shape of the undercuts 5A and 5B and the corresponding cutouts 27 of the base plate 18 of the connection element 17 is a question of adapting to the shape and the dimensions of the busbars 4 being used. The convex wall sections 10 of the upper closed chambers 9 do not have to have a roof shape, but instead they could also have a round shape. Modifications such as these and comparable modifications are left to the discretion of someone skilled in the art and shall be included by the protection of the claims.

The invention claimed is:
1. An insulator for a multi-pole conductor line, comprising: a body formed as a unitary part defining
    an insulating profile having at least one chamber that extends in a longitudinal direction of the profile, and that is open in cross section toward one side and that, therefore, defines an open front side of the insulating profile and that is suitable for holding a busbar, the opening of the open chamber expands at the front side of the insulating profile in a lateral direction of the profile, such that the surface of the front side of the insulating profile is inclined towards an intersection of adjacent open chambers to form substantially a peak therebetween, the insulating profile having a regular arrangement of a group of several chambers that extend in the longitudinal direction of the profile and that are open toward one side and that are each suitable for holding a busbar, and each of wall sections located between the openings of the open chambers have an opening at a specified distance from the corresponding end face of the insulating profile on the front side of the insulating profile close to each of the two end faces of the insulating profile.

2. The insulator according to claim 1, wherein the openings have a shape that can be generated by a single cut in the transverse direction of the insulating profile close to each end face of this profile in the wall sections located between the openings of the open chambers on the front side of the insulating profile.

3. The insulator according to claim 1 wherein the profile has a regular arrangement of several chambers extending in the longitudinal direction of the profile, wherein at least one group of chambers is present, wherein these chambers are closed in cross section, and wherein wall sections of several adjacent closed chambers together form a rear wall of the insulating profile opposite the open front side of the insulating profile, the closed chambers of a first group extend from the rear wall of the profile in the direction toward the open front side of the profile past the provided position of front surfaces of the busbars into the open chambers, and that at least one closed chamber of this first group is arranged between two adjacent open chambers.

4. The insulator according to claim 3, wherein a closed chamber of another group is arranged between two adjacent closed chambers of the first group and that wall sections of closed chambers of the first and the other group together form the rear wall of the profile.

5. The insulator according to claim 3 wherein a closed chamber of another group is arranged on the open front side of the insulating profile between two adjacent open chambers and that each of these borders a closed chamber of the first group.

6. The insulator according to claim 3 wherein the profile end faces are planar.

7. The insulator according to claim 3 wherein the profile has, on its edge, an open chamber with a shape that deviates from the other open chambers and that is suitable for positive-fit holding of a data line running along the conductor line and/or a data carrier provided with position information.

8. The insulator according to claim 1 wherein attachment elements for attaching to a carrier profile are formed integrally on the rear wall of the insulating profile.

9. An insulator for a conductor line, comprising:
a body formed by extrusion of an electrically insulating material, the body including
at least two adjacent open chambers extending along a longitudinal dimension of a front surface of the extrusion,
an inclined surface extending from within each adjacent chamber and joining to form a substantially peaked surface separating two adjacent chambers, said peaked surface and inclined surfaces thereby configured to guide a conductor into either one or the other adjacent chamber,
each adjacent open chamber sized and dimensioned to retain a conductor within the open chamber,
the body formed in segments mutually connectable by a connecting element insertable between the segments, whereby the open chambers are continuously open to admit passage of a moving conductor of a vehicle.

10. The insulator of claim 9, wherein the inclined surface is substantially continuously inclined between adjacent open chambers.

11. The insulator of claim 9, wherein the peaked surface forms substantially a point between adjacent open chambers.

12. The insulator of claim 9, wherein the connecting element is slideable and securable within chambers opened at abutting end faces.

13. The insulator of claim 12, wherein the connecting element is a plug.

14. The insulator according to claim 9, the body further including at least one closed chamber.

15. The insulator according to claim 14, wherein at least one first closed chamber is arranged between two adjacent open chambers.

16. The insulator according to claim 15, wherein at least two adjacent second closed chambers form a rear wall of the body, wherein a first closed chamber has a different size and dimension as a second closed chamber.

17. The insulator according to claim 9, the body further including an open chamber with a shape that deviates from the other open chambers and that is suitable for positive-fit holding of a data line running along the conductor line and/or a data carrier provided with position information.

18. An insulator for a multi-pole conductor line, comprising:
a body formed as a unitary part defining
an insulating profile having at least one chamber that extends in a longitudinal direction of the profile, and that is open in cross section toward one side and that, therefore, defines an open front side of the insulating profile and that is suitable for holding a busbar,
the opening of the open chamber expands at the front side of the insulating profile in a lateral direction of the profile, such that the surface of the front side of the insulating profile is inclined towards an intersection of adjacent open chambers to form substantially a peak therebetween,
the insulating profile having a regular arrangement of a group of several chambers that extend in the longitudinal direction of the profile and that are open toward one side and that are each suitable for holding a busbar,
the profile having a regular arrangement of several chambers extending in the longitudinal direction of the profile, wherein at least one group of chambers is present, wherein these chambers are closed in cross section, and wherein wall sections of several adjacent closed chambers together form a rear wall of the insulating profile opposite the open front side of the insulating profile, the closed chambers of a first group extend from the rear wall of the profile in the direction toward the open front side of the profile past the provided position of front surfaces of the busbars into the open chambers, and that at least one closed chamber of this first group is arranged between two adjacent open chambers, the profile has, on its edge, an open chamber with a shape that deviates from the other open chambers and that is suitable for positive-fit holding of a data line running along the conductor line and/or a data carrier provided with position information.

19. The insulator according to claim 18, wherein a closed chamber of another group is arranged between two adjacent closed chambers of the first group and that wall sections of closed chambers of the first and the other group together form the rear wall of the profile.

20. The insulator according to claim 18 wherein a closed chamber of another group is arranged on the open front side of the insulating profile between two adjacent open chambers and that each of these borders a closed chamber of the first group.

* * * * *